United States Patent [19]

Parkison

[11] 4,378,029
[45] Mar. 29, 1983

[54] SINGLE CONTROL FAUCET

[75] Inventor: Richard G. Parkison, Louisville, Ky.

[73] Assignee: American Standard Inc., New York, N.Y.

[21] Appl. No.: 326,233

[22] PCT Filed: Nov. 2, 1981

[86] PCT No.: PCT/US81/01474
 § 371 Date: Nov. 2, 1981
 § 102(e) Date: Nov. 2, 1981

[51] Int. Cl.³ ............................................. F16K 11/02
[52] U.S. Cl. ........................... 137/625.4; 137/625.17; 137/636.3
[58] Field of Search ............. 137/625.17, 625.4, 636.2, 137/636.3, 636.4

[56] References Cited
U.S. PATENT DOCUMENTS 3,965,936 6/1976 Lyon ................................ 137/625.17

FOREIGN PATENT DOCUMENTS 2735544 2/1979 Fed. Rep. of Germany ... 137/625.4
2737478 2/1979 Fed. Rep. of Germany ... 137/625.4

Primary Examiner—Martin P. Schwadron
Assistant Examiner—John A. Rivell
Attorney, Agent, or Firm—Robert G. Crooks; James J. Salerno, Jr.; John P. Sinnott

[57] ABSTRACT

This mixing valve for a single spout, single handle faucet provides a stationary valve seat (24) having two fluid apertures, and a valve plate (28), relatively rotatable with respect to the valve seat and pressed against the valve seat surface. The valve plate has a generally central aperture (31) and a peripheral aperture (or bight) (30). The arcuate half-circle shape of the downstream outlets (27 and 27A) of the valve seat hot and cold fluid apertures in combination with the placement and shape of the apertures in the valve plate allows the mixing valve to be adaptable to use with either a knob (53) or lever-type (59) control handle and in back-to-back plumbing installations by simply rotating the valve plate 180° relative to the valve seat upon installation.

3 Claims, 9 Drawing Figures

SINGLE CONTROL FAUCET

In many single handle faucets the handle is in the form of either a knob or a lever-type handle. Both types of handle tilt upward in the same manner to initiate water flow, but a rotation to the right of a knob produces a clockwise rotation of the body of the handle, whereas a movement of a lever to the right produces a counter clockwise rotation of the body of the handle, and vice versa. Because of the need to follow the convention of having cold water flow from a movement of the control handle to the right and hot water flow with a movement of the handle to the left, the mixing valve housed within the body of the faucet has usually had to be designed to be used with only one of these two general types of handle.

Single control faucets are frequently used in multiple-dwelling structures, of which high-rise apartment blocks, hotels and the like are typical. It is the customary practice in multiple-dwelling buildings, office blocks, and the like to locate separate lavatory facilities in adjoining rooms. In this way it is possible to realize substantial construction cost savings by placing plumbing fixtures back-to-back on opposite sides of a common wall or partition. Frequently, in these circumstances, the fixtures are connected to common hot and cold water supply risers. The reverse orientation of the hot and cold water mixing valve inlets on the plumbing fixtures relative to the common conduits to which they must be connected in this back-to-back arrangement creates an obvious difficulty with respect to the need to follow the convention outlined above permitting cold water flow upon turning the control handle to the right and hot water flow upon turning the handle to the left for faucets on both sides of the partitions. Ordinarily, expensive and time consuming plumbing procedures have been required to connect the valves in a manner that will preserve this conventional arrangement.

Single handle mixing faucets sometimes incorporate a mixing valve which includes a hollow valve body in which are formed respective inlet openings for entry of hot and cold water from the water supply lines and outlet openings for discharge of the water into a spout and thence into a sink or lavatory in the desired quantity and at the desired temperature. A valve seat is provided within the valve body and includes ports that correspond to the water inlet openings in the valve body. A valve plate also is provided and arranged for slidable contact with the valve seat. The valve plate frequently has either recesses formed in its surface adjacent to the valve seat or ports that penetrate the valve plate. Through appropriate manipulation of the control handle, the recesses or ports in the valve plate are disposed to cooperate with the corresponding ports in the valve seat to mix hot and cold water to produce a desired mixture temperature and intensity.

DISCLOSURE OF THE INVENTION

Accordingly, it is an object of this invention to provide a mixing valve that satisfies all of the basic requirements for such a valve and one which is easily adaptable to a knob or lever-type control handle faucet and which is easily adaptable in the field to back-to-back plumbing installations.

Other objects of this invention are to provide a mixing valve which is smaller, less expensive to manufacture, and easier to operate than prior-art mixing valves.

Briefly, I have fulfilled the above-listed objects, and other objects of my invention, by providing a mixing valve incorporating a stationary valve seat, of ceramic or other material, having two ports that establish fluid passages for hot and cold water, respectively, from the supply lines. A movable valve plate, of ceramic or other material, having a peripheral aperture (or bight) and a generally central aperture, is positioned, through manipulation of the handle to which it is coupled, in sliding engagement with the upper, or downstream, surface of the stationary valve seat, the valve plate apertures having a major dimension and a minor dimension perpendicular thereto. The sliding motion of the movable plate, both longitudinally and transversely, controls the communication between the ports in the fixed valve seat and those in the movable valve plate.

To accommodate the reverse orientation of the hot and cold supply risers in a back-to-back configuration, or to accommodate the opposite angular rotation of the plate in response to a knob or a lever-type control handle, it is only necessary upon installation to shift the position of the rotatable plate 180° relative to the stationary seat with which it abuts.

This simplicity and adaptability is due to the unique configuration of the hot and cold fluid outlets in the surface of the valve seat which abuts the valve plate, in conjunction with the unique configuration of the ports in the valve plate. In each of the two possible orientations of the valve plate relative to the valve seat, a tilting up movement of the control handle will bring one of the valve plate ports into communication with the hot and cold fluid outlets in the valve seat. Due to the unique arcuate half-circle form of the valve seat hot and cold fluid outlets, and due to the fact that each valve plate port communicates with an opposite end of these outlets, a sideways movement of the plate in one of its orientations will increase flow through one valve seat outlet, whereas a sideways movement of the plate in the same direction when it is in the other orientation, will increase flow through the other valve seat outlet. In this way, a knob or lever-type control handle in conjunction with any water supply riser orientation may be easily accommodated.

These and other features and advantages of the invention are expressed in more complete detail in the following description of a specific embodiment of the invention, when taken in conjunction with the figures of the drawing. The scope of the invention, however, is limited only by the claims.

BRIEF DESCRIPTION OF THE DRAWINGS

FIG. 7 is a plan view of the valve seat shown in FIGS. 1 through 5;

FIG. 8 is a bottom elevation of the valve seat shown in FIG. 7; and

BEST MODE OF CARRYING OUT THE INVENTION

Figure 1:
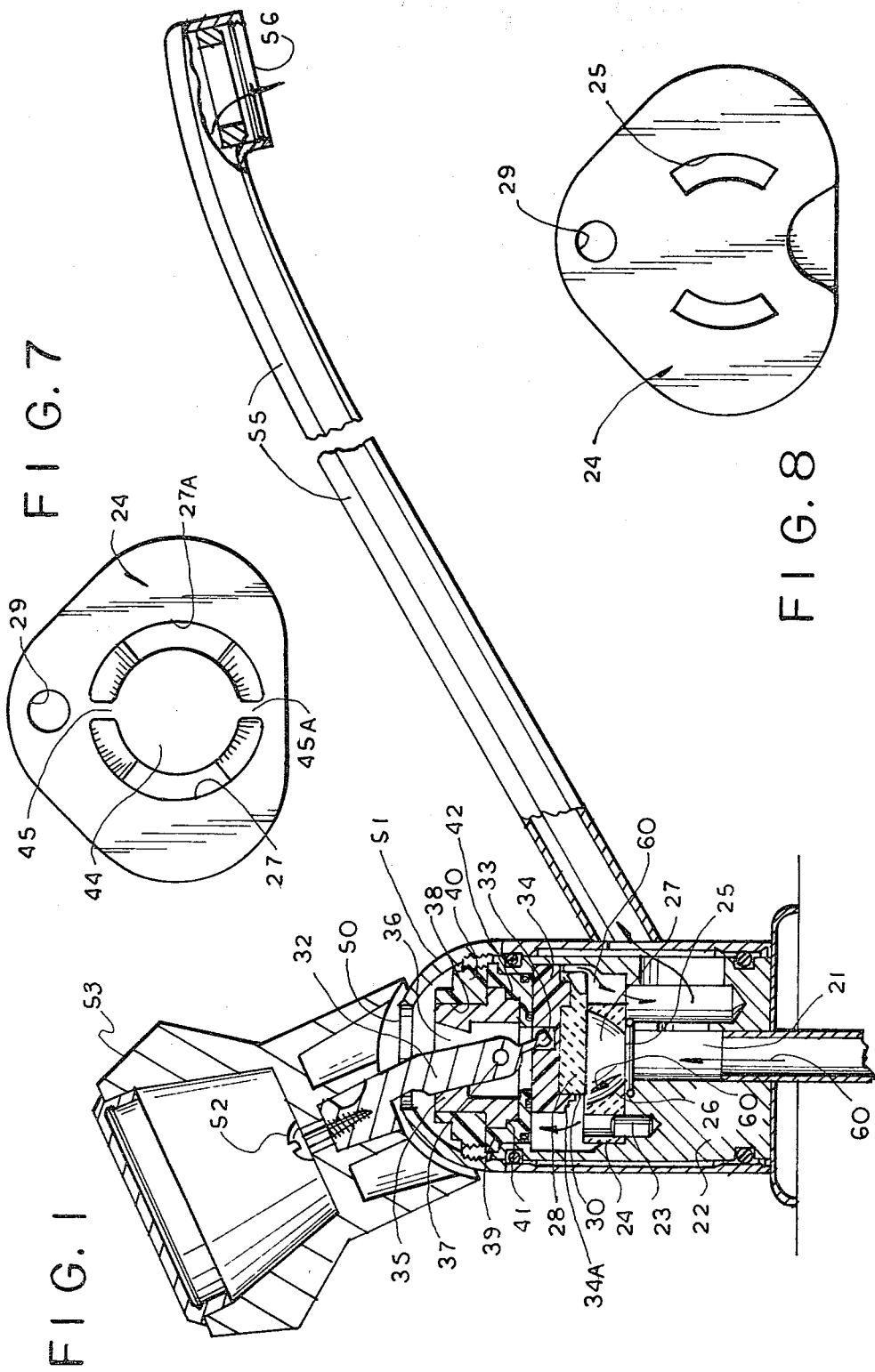
FIG. 1 is a side elevation in full section of a faucet body, as viewed through the hot water port.

For a more thorough understanding of the invention, attention is invited to FIG. 1, which shows inlet 21 whereby hot water enters the valve body 22 of the faucet from the hot water line. The locating pin 23 holds a wafer-like stationary ceramic valve seat 24 in its proper relative position within the valve body 22. An upstream water inlet 25 in the valve seat 24 conforms in size to the inlet 21 that brings the water from the respective water supply line. Sides 26 of the hot water port (and the cold water port, not shown in FIG. 1) through the valve seat 24 fan outward to form the hot water outlet 27 (and cold water outlet, not shown) in the downstream surface of the valve seat 24, which abuts a movable ceramic valve plate 28. This hot water outlet 27, as best shown in FIGS. 2 through 5, is an arcuate semicircle, which, in combination with the transversely spaced and similarly shaped cold water inlet 27A, forms a generally circular land 44 in the body of the valve seat, the inlets 27 and 27A being separated by narrow neck portions 45 and 45A of the valve seat.

As best illustrated in FIGS. 7 and 8, the valve seat 24 is, in plan view, of a generally triangular shape. The arcuate hot water inlet 25, on the upstream side (FIG. 8) has a length that matches the diameter of the hot water inlet 21. On the downstream side of the seat 24 (FIG. 7), however, the arcuate hot water outlet 27 is much larger in size than its corresponding inlet, the entire passageway undergoing a significant transition to increased size in proceeding from upstream to downstream sides as described subsequently in more complete detail. Note also that a similar size transition also is provided for the cold water outlet 27A.

Figure 2:
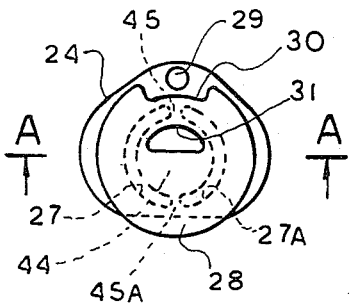
FIG. 2 is a plan view of the stationary valve seat with the movable valve plate on top thereof, in the "closed" position.

For a clear understanding of the relationship between the valve seat 24 and the valve plate 28, attention is invited to FIG. 2, wherein the mixing valve is shown in the "closed" position in a plan view with the valve plate 28 superimposed on the downstream surface of the valve seat 24. Also shown in FIG. 2 is a hole 29 in the valve seat which accommodates the locating pin 23 (not shown in FIG. 2). Semicircular hot and cold fluid outlets 27 and 27A, respectively, in the surface of the valve seat 24 abut the valve plate 28. With respect to the valve plate 28, moreover, a peripheral bight 30 is formed in the perimeter of the disk-like plate and a generally semicircular aperture 31 is formed in the plate near, but eccentric with respect to, its center. Both the bight 30 and the aperture 31 are axially symmetric and in general are in radial alignment and subtend the same angular arc of the plate. Note further that the transverse widths (major dimensions) of the eccentric aperture 31 and the bight 30 are each substantially greater than the neck portions 45 and 45A of the valve seat 24, while the minor dimension of the aperture 31 is substantially narrower than the diameter of the circular land 44 of the valve seat 24.

Figure 3:
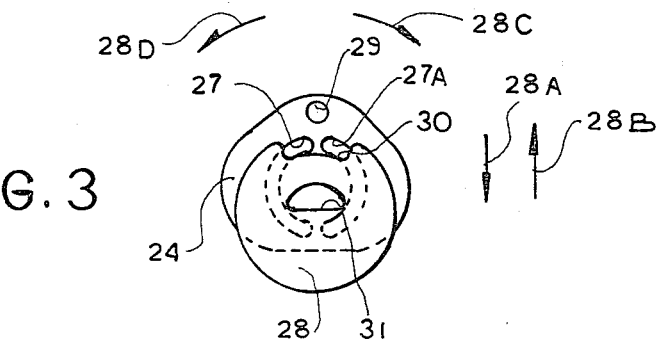
FIG. 3 is a plan view of the stationary valve seat with the movable valve plate on top thereof, in the full open, even mix position.

As illustrated in FIG. 3, the bight 30 can be made to uncover portions of the downstream outlets of the hot and cold water ports. Longitudinal movement of the movable valve plate 28 in the direction of the arrow 28A begins or increases flow through the hot and cold outlets 27 and 27A at the bight 30 in the plate. Motion of the plate 28 in the direction of the arrow 28B, however, toward the locating pin hole 29, has the effect of decreasing the flow volume from the outlets 27 and 27A by progressively obstructing the areas of these outlets until obstruction of these outlets is complete and flow stops, as illustrated in FIG. 2.

As shown in FIG. 3, the mixture of hot and cold waters flowing from the outlets 27 and 27A is equally balanced. To make the mixture colder, the plate 28 is rotated in the direction of the arrow 28C. Thus, by progressively blocking the discharge area of the hot water outlet 27 as the bight 30 in the valve plate 28 moves to the right as viewed in FIG. 3, the proportion of cold water in the mixture proportionately increases until flow through the outlet 27 is completely obstructed by the overlying portion of the valve plate 28 and the flow is only of cold water from the outlet 27A.

In a similar manner, by rotating the valve plate 28 in the direction of the arrow 28D the water mixture is made progressively hotter as more of the hot water outlet 27 is exposed within the bight 30 and the cold water outlet 27A is increasingly obstructed by the overlying portion of the plate 28.

Figure 4:
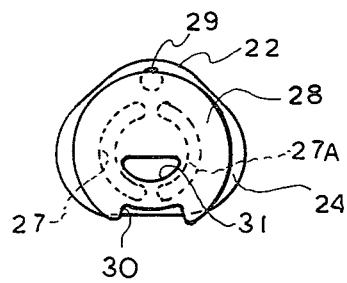
FiG. 4 is a plan view of the stationary valve seat with the movable valve plate on top thereof, in the "closed" position, with the valve plate rotated 180° from the position in FIG. 2.
Figure 5:
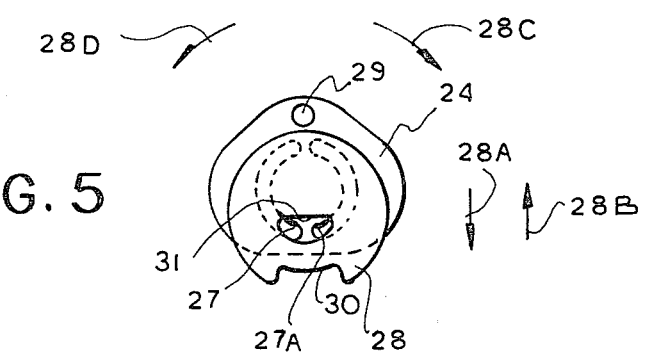
FIG. 5 is a plan view of the stationary valve seat with the movable valve plate on top thereof, in the full open, even mix position, with the valve plate rotated 180° from the position in FIG. 2.

Turning now to FIGS. 4 and 5, we find the valve plate 28 has been turned 180° in relation to the valve seat 24. In FIG. 4 the mixing valve is again shown in the "closed" position. As illustrated in FIG. 5, it is now the eccentric aperture 31 which can be made to uncover portions of the outlets 27 and 27A of the hot and cold water ports. Note that it is still the longitudinal movement of the valve plate 28 in the direction of arrow 28A which begins or increases flow through the outlets 27 and 27A, this time through the eccentric aperture 31. And once again, motion of the plate 28 in the direction of arrow 28B has the effect of decreasing the flow volume from the outlets 27 and 27A by progressively obstructing the areas of these outlets until obstruction of these outlets is complete and flow stops, as illustrated in FIG. 4.

As shown in FIG. 5, the mixture of hot and cold water flowing from the outlets 27 and 27A is equally balanced. To make the mixture colder, the plate is rotated in the direction of arrow 28D, progressively blocking the outlet 27 and progressively increasing the flow through outlet 27A. It will be recalled that to make the water mixture colder in the valve plate-valve seat configuration shown in FIG. 3, the valve plate 28 rotated oppositely, in the direction of arrow 28C. By rotating the valve plate 28 in FIG. 5 in the direction of arrow 28C, hot water flow through outlet 27 is increased and cold water flow through outlet 27A is decreased.

Figure 9:
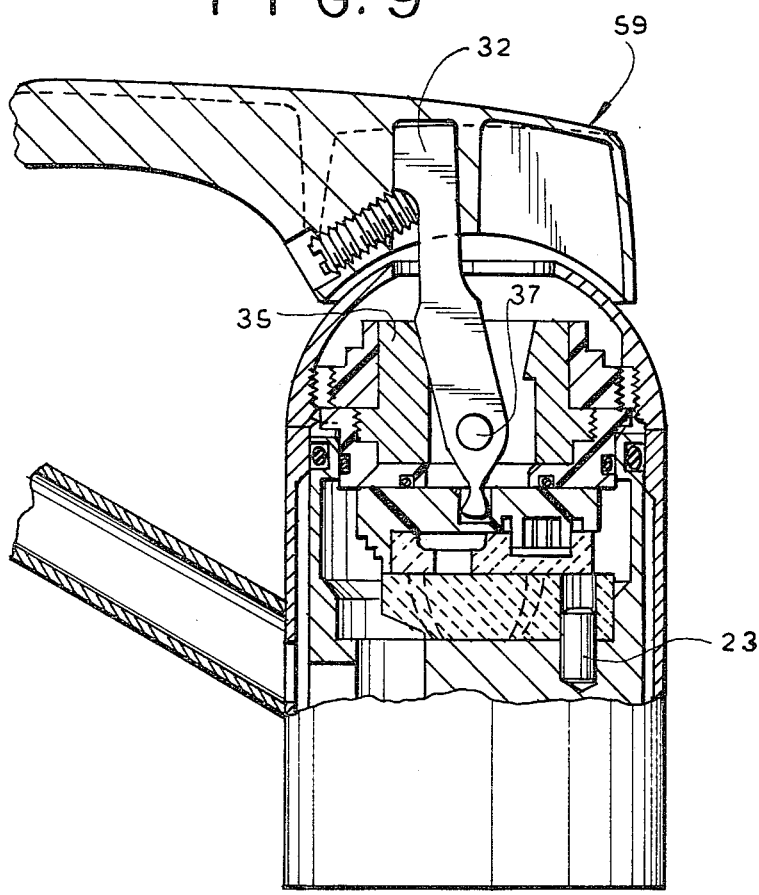
FIG. 9 is a side elevation in full section of a lever controlled valve.

It will be recalled that a salient feature of the invention is the ability of the combined valve seat 24 and the valve plate 28 to conform to the hot and cold water flow convention with respect to the movement of a knob or lever-type control handle and to be swiftly adaptable to back-to-back plumbing installations, in which hot and cold water supply line placement is reversed, without requiring special fittings or complicated installation procedures. In accordance with this aspect of the invention let us turn to the differing control handle designs—a knob type handle 53 (FIG. 1) and a lever-type handle 59 (FIG. 9). Both types of handle tilt upwards, away from the user, to open the mixing valve and increase the water flow. The corresponding longitudinal movement of the valve plate 28 in the direction of arrows 28A was described above in relation to FIGS. 3 and 5. It will be recalled that in each of the two possible orientations of the valve plate 28, it is a longitudinal movement of the plate in the same direction which serves to begin or increase water flow through the mixing valve—in one case bringing the bight 30 into communication with outlets 27 and 27A and in the other case bringing the eccentric aperture 31 into such communication. This longitudinal movement of the plate 28 in the direction of arrow 28A is in response to a tilting up movement of the control handle, whether a knob or lever-type handle.

Although fore-and-aft movements of both types of handle have an identical effect on the valve plate 28, side-to-side movements of the handles produce different effects: when a knob-type handle 53 (FIG. 1) is used, the operator, to obtain cold or colder water, is conditioned by convention to rotate the knob to the right. When a knob is turned to the right in a clockwise manner (in the direction of arrows 28C in FIGS. 3 and 5), the valve plate also turns in the direction of arrows 28C. Therefore, with hot water coming through aperture 27 and cold water through aperture 27A, a knob-type control handle 53 is used with the valve plate orientation shown in FIGS. 2 and 3 with the bight 30 being the active control port. As the knob is turned to the right the valve plate rotates clockwise in the direction of arrow 28C—more of outlet 27A and less of outlet 27 is exposed and the exiting water becomes colder. A lever-type handle, however, functions differently. When a lever-type handle 59 (FIG. 9) is used, the operator, to obtain cold or colder water, is conditioned by convention to move the end of the lever to the right. When the extending handle of a lever is moved to the right from the point of view of the user, the body of the handle, and, therefore, the valve plate 28, move counterclockwise in the direction of arrows 28D. Thus, with hot water coming through outlet 27 and cold water through outlet 27A, the valve plate orientation shown in FIGS. 4 and 5 is necessary, with the eccentric central aperture 31 being the active control port. As the lever is moved to the right, the valve plate rotates counterclockwise in the direction of arrows 28D—more of outlet 27A and less of outlet 27 is exposed and the exiting water becomes colder.

To turn now to the requirements of back-to-back plumbing installations, connections to the hot and cold water supply risers may be made in the same straightforward manner for plumbing fixtures on either side of the dividing partition: to accommodate hot water coming through outlet 27A and cold water through outlet 27 (the opposite to what we have discussed so far), and still preserve the convention of increased cold water flow by turning the faucet control handle to the right, (i.e., with a knob-type handle, the knob is rotated to the right, and with a lever-type handle, the end of the lever is moved to the right), it is only necessary to use the valve plate 28 orientation shown in FIGS. 2 and 3 with a lever-type control handle and the valve plate 28 orientation shown in FIGS. 4 and 5 with a knob-type control handle.

In this way, through a simple mechanical reorientation of the valve plate 28 relative to the valve seat 24, the valve body 22 is able to accommodate two entirely different types of flow control handle and two opposite orientations of hot and cold water flow from the inlet supply lines.

Clearly, in selecting the desired mixture temperature and flow intensity it is not necessary to divide the motion of the movable plate 28 into two separate and distinct steps, i.e., longitudinally in the directions of the arrows 28A and 28B and transversely in the directions of the arrows 28C and 28D. A composite resultant movement of the plate 28 in a direction that forms some acute or obtuse angle relative to the arrows 28A through 28D will provide the desired combination of flow intensity and temperature mix.

Returning to FIG. 1, the relative arrangement of the valve plate 28 and the valve seat 24 shown therein corresponds to the configuration shown in FIG. 3. The bight 30 in the valve plate 28 permits fluid communication with both the fluid outlets 27 and 27A (of which only the hot fluid outlet is shown in FIG. 1) in the surface of the valve seat 24.

Figure 6:
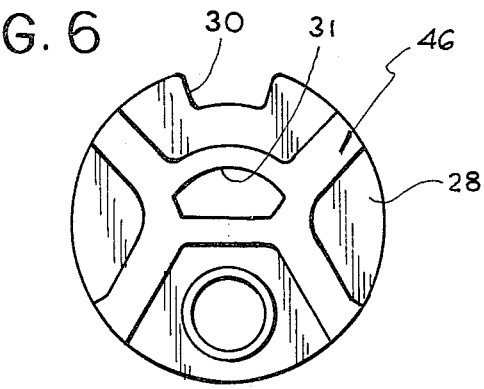
FIG. 6 is a plan view of the valve plate shown in FIGS. 1 through 5 illustrating fluid discharge passageways.

A finger-like pivot stem 32 protrudes through a central aperture 50 in a housing 51 that is secured to the valve body 22. The end of the pivot stem 32 that protrudes through the housing 51 is secured by means of a screw 52, or the like, to a decorative knob or handle 53. The end of the stem 32 that is within the housing 51 has a tail 33 that is received in a closely conforming cavity in a generally flat valve plate holder 34. The plate holder 34 is provided with a concave recess on the side that is opposite to the cavity that receives the tail 33. This concave recess fits over and provides a snug mounting for the slidable valve plate 28 to enable the valve plate to bear against and slide relative to the adjacent opposing surface of the valve seat 24. Note also in this respect that the projection on the holder 34 that nests into the bight 30 in the valve plate has a progressively ranked set of three small ridges 34A. These ridges, it has been found, are very effective in suppressing noise during fluid flow within the valve. The holder 34 also is provided with four equidistantly separated apertures in its circumference, to match in relative orientation with four fluid channels 46 (FIG. 6) in the valve plate 28. These channels also are in fluid communication with the eccentric, semicircular aperture 31. The channels 46 are formed in the side of the plate 28 that is adjacent to and within the holder 34 and that is not in contact with the valve seat 24. Thus, fluids pouring through the aperture 31 are able to flow out of the holder by way of the channels 46.

The pivot stem 32 is carried by a bearing structure 35 that is secured within the housing 51 to the valve body 22. The bearing structure 35 has a central, lengthwise passageway 36 within which the pivot stem 32 is mounted. The bearing structure 35 supports the pivot stem 32 by means of a transverse pivot pin 37 which penetrates (not shown in the drawing) the pivot stem 32 at its fulcrum. The ends of the pin 37 are set in diametrically opposed holes (not shown in the drawing) in the bearing structure 35.

Bearing structure 35 is supported for limited rotational motion in a race 38 that is jointly defined by the inner surfaces of an annular support cap 39 and a cylindrical top cap 40 that is superimposed upon the support cap. The bearing structure 35 is provided with a pair of ears 41 and 42 which are located in positions diametrically opposed to each other on a cylindrical surface which circles the equatorial portion of bearing structure 35. Ears 41 and 42 extend into respective slots located in the support cap 39. The rotational motion of bearing structure 35 is limited when ears 41 and 42 strike stops (not shown) in support cap 39.

The movement of the pivot stem 32 within the passageway 36 and the limited degree of angular rotation permitted to the bearing structure 35 which, it will be recalled, also supports the pivot pin 37 and the pivot stem 32, thus provides the longitudinal and rotational degrees of free motion illustrated in FIGS. 3 and 5 by means of the arrows 28A through 28D. Consequently, as the handle 53 (FIG. 1) is moved about the pivot pin 37, the plate holder 34 and the valve plate 28 nested within the holder, are moved longitudinally to produce relative orientations between the valve plate 28 and the valve seat 24 that are shown in FIGS. 3 and 5. The motion thus imparted by the handle 53 in this instance corresponds to the direction of motion for the valve plate 28 illustrated in FIG. 3 by means of the arrows 28A and 28B in order to control the intensity, or volume rate of flow through the faucet. With this orientation, approximately equal amounts of hot and cold water flow from the fluid outlets 27 and 27A and into the annulus adjacent to the bight 30.

As best shown, perhaps, in FIG. 1, this mixture of hot and cold water then flows in the direction of the arrows 60 through the annulus defined by the plate holder 34 and the adjacent portion of the housing 51 in order to enter a spout 55. The water in the spout 55, of course, is discharged from nozzle 56 and into a sink, or the like (not shown).

To regulate the temperature of the water mixture, the handle 53 is rotated in clockwise or counterclockwise directions in order to partially or fully obstruct or open the hot and cold water outlets 27 and 27A, respectively, shown in FIGS. 2 through 5. Thus, rotation of the bearing structure 35 and the associated pivot stem 32 relative to the fixed housing 51 shifts the valve plate relative to the valve seat 24 in the directions of the arrows 28C and 28D.

INDUSTRIAL APPLICABILITY

It will be recalled that a main feature of this invention is the fact that it is compatible, with only minor adjustment, with either side of a back-to-back plumbing installation and with different handle mechanisms, in which the side-to-side motions of the two types of handle produce opposite movements of the valve plate 28 relative to the valve seat 24. Thus, there is provided a mixing valve that can accommodate entirely different types of control handles and hot and cold water supply riser orientations through a simple adjustment to the valve plate 28.

What is claimed is:

1. A mixing valve comprising a valve seat having a hot fluid aperture and a cold fluid aperture formed therein, the outlets of said apertures each being substantially arcuate in shape and forming almost a full half-circle enclosing a substantially circular land of the body of the valve seat with narrow neck portions of the body of the valve seat separating the converging ends of said arcuate outlets, a valve plate having a surface abutting said valve seat and movable longitudinally and transversely relative to said valve seat, said valve plate having a peripheral aperture and an aperture formed eccentrically relative to the center of said plate to establish selective fluid communication with portions of said arcuate hot and cold fluid apertures in said valve seat, and means for moving said valve plate relative to said valve seat in order to selectively register either said peripheral aperture or said eccentric central aperture with portions of said arcuate apertures.

2. A mixing valve according to claim 1 wherein said hot and cold fluid apertures have sides within said valve seat wherein the portion of said sides leading from the said narrow neck portions of said valve seat body slope inwardly to form hot and cold fluid inlet apertures on the upstream side of said valve seat.

3. A mixing valve according to claim 1 wherein said eccentric central valve plate aperture is formed in the area of the plate which is within said circular land of the valve seat, and, selectively, wherein the peripheral aperture of the valve plate is formed in the periphery of the plate which is outside of said arcuate hot and cold fluid outlets, the width of said peripheral aperture and said eccentric central aperture being substantially greater than the width of said narrow neck portions of the valve seat, and the minor dimension of said eccentric central aperture being substantially narrower than the diameter of said circular land; wherein said peripheral aperture and said eccentric central aperture are longitudinally symmetrical; wherein, with the valve in the closed position, the distance between the inner edge of the peripheral aperture and the inner edges of the arcuate hot and cold fluid outlets of the valve seat is approximately the same as the distance between the outer edge of the eccentric central aperture and the outer edges of the hot and cold fluid outlets, said distance representing approximately the full longitudinal movement of the plate with respect to the valve seat.

* * * * *